United States Patent Office 2,752,357
Patented June 26, 1956

2,752,357

CYCLIC COMPOUNDS

Warren H. Watanabe, Philadelphia, Pa., assignor to Rohm & Haas Company, Philadelphia, Pa., a corporation of Delaware No Drawing. Application June 20, 1955,
Serial No. 516,761

5 Claims. (Cl. 260—307)

This invention concerns cyclic compounds of the general structure

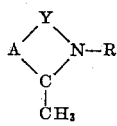

where A is O, =NH, or =NR, Y is an alkylene group having two to three carbon atoms thereof between A and N and containing not over 12 carbon atoms and preferably from two to four carbon atoms, and R is hydrogen or a hydrocarbon group, usually an alkyl, aryl, aralkyl, or cycloalkyl group preferably of not over 12 carbon atoms and free of olefinic or acetylenic unsaturation.

This invention also deals with a process for preparing these compounds wherein a compound of the formula

HA—Y—NHR is reacted with a vinyl ether in the presence of a catalyst which is a soluble silver salt or a mercury salt of a carboxylic acid having a pKa value of 3.5 to 7 by mixing a said compound, a vinyl ether, and a catalyst, heating the mixture and separating the cyclic product.

The process is carried out by mixing a said compound, a vinyl ether, and a defined catalyst and heating the mixture, conveniently at reflux temperatures, although where the product boils at a suitable temperature which is lower than the distilling point of the reactants, the product may be distilled off as it is formed. Temperatures of reaction are generally between 50° and 150° C.

Inert organic solvent may be used when desired, such as aromatic hydrocarbons and saturated ethers, including benzene, toluene, dioxane, isopropyl ether, dibutyl ether, dibutyl acetal, the diethyl ether of ethylene glycol or of diethylene glycol, etc.

As a starting material where A is oxygen, there may be used any of the hydroxyethyl- or hydroxypropyl-amines having a hydrogen on the nitrogen thereof,

HO—Y—NHR where Y is an alkylene group, preferably of not over four carbon atoms, although it may be larger and thus supply C-alkyl substituents conveniently as large as 9 or 10 carbon atoms. Typical hydroxy amines are ethanolamine, 1 - amino - 2 - propanol, 2 - amino - 1 - propanol, 2-amino - 2 - methyl - 1 - propanol, 2 - amino - 1 - butanol, 3 - amino - 1 - butanol, 3 - amino - 1 - propanol, 2 - amino - 1 - hexanol, 3 - amino - 1 - hexanol, N - methylethanolamine, N - methyl - 1 - amino - 2 - propanol, N - methyl - 2 - amino - 1 - propanol, N - butylethanolamine, N-phenylethanolamine, N - cyclohexylethanolamine, or N-butyl - 3 - aminopropanol.

For preparation of compounds having two nitrogens in the cycle there are used diamines.

Typical diamines include ethylenediamine, 1,2-propylenediamine, 1,3 - propylenediamine, 1,2 - butylenediamine, 1,3 - butylenediamine, 2,3 - butylenediamine, 1,2-hexylenediamine, 1,3 - hexylenediamine, N - methylethylenediamine, N - octylethylenediamine, N - benzylethylenediamine, N - phenylethylenediamine, N - cyclohexylethylenediamine, N - methyl - 1,2 - hexylenediamine, and similar N - alkyl, N - aralkyl, N - aryl, and N - cycloalkyl substituted 1,2- or 1,3-alkylenediamines, N,N'-dimethylethylenediamine, N,N' - dimethyl - 1,2 - propylenediamine, N,N' - dimethyl - 1,3 - propylenediamine, N,N'-dibenzylethylenediamine, N,N' - diphenylethylenediamine, N,N' - di - 2 - ethylhexylethylenediamine, N,N' - dicyclohexylethylenediamine, and other N,N'-disubstituted 1,2- or 1,3-alkylenediamines where the substituents are alkyl, cycloalkyl, aralkyl, or aryl.

As vinyl ethers to be reacted there may be used practically any vinyl ether which is free of a substituent which reacts with and destroys the catalyst. The more useful vinyl ethers may be represented by the formula $R^0OCH=CH_2$, where $R^0$ is alkyl, alkenyl, aralkyl, cycloalkyl, alkoxyalkyl, alkenyloxyalkyl, phenoxyalkyl, alkoxyalkoxyalkyl, hydroxyalkyl, and the like. Useful vinyl ethers include polyethers of polyhydric alcohols. Typical ethers which serve as starting materials include methyl vinyl ether, ethyl vinyl ether, butyl vinyl ether, isobutyl vinyl ether, sec-butyl vinyl ether, tert-butyl vinyl ether, hexyl vinyl ether, 2-ethylhexyl vinyl ether, octyl vinyl ether, nonyl vinyl ether, dodecyl vinyl ether, divinyl ether, allyl vinyl ether, methallyl vinyl ether, undecenyl vinyl ether, cyclohexyl vinyl ether, tetrahydrofurfuryl vinyl ether, benzyl vinyl ether, methoxyethyl vinyl ether, ethoxyethyl vinyl ether, ethoxyethoxyethyl vinyl ether, butoxyethyl vinyl ether, propoxypropyl vinyl ether, octyloxyethyl vinyl ether, cyclohexoxyethyl vinyl ether, phenoxyethyl vinyl ether, butylphenoxyethyl vinyl ether, benzyloxyethyl vinyl ether, methallyloxyethyl vinyl ether, hydroxyethyl vinyl ether, hydroxypropyl vinyl ether, the divinyl ether of ethylene glycol, propylene glycol, diethylene glycol, etc. Ethers with R groups having not over 16 carbon atoms are preferred as starting materials, although larger R groups can be used.

The vinyl ether selected should distill in a range different from that of the product. Also, the alcohol freed from the vinyl ether should distill in a different range from the product. Frequently, it is convenient to use a vinyl ether giving an alcohol which is low boiling. On the other hand when the reaction is improved by resort to relatively high temperatures, it is obviously desirable to use a vinyl ether of high boiling point. This is particularly true when the product is not fully stable at the temperature of reaction and it is, therefore, desirable to remove product about as rapidly as formed.

As catalysts, there may be used silver salts which are soluble in an aqueous system, including silver nitrate, silver sulfate, silver benzoate, silver lactate, silver propionate, or silver acetate, or preferably, mercuric salts of carboxylic acids having a pKa value in water in the range of 3.5 to 7. The most important of these is mercuric acetate, because of its ready availability, but it is often desirable to utilize mercury salts of such acids as benzoic, methoxyacetic, 2-ethylbutyric, succinic, adipic, lactic, malic, and like acids which react with mercury only to form salts.

It is sometimes desirable to use a mercury salt of an acid larger than acetic acid. For this purpose the readily available mercury acetate may be mixed with a carboxylic acid boiling higher than acetic acid, usually in an organic solvent, and acetic acid is taken off by heating. The acid and mercury acetate may be mixed in a high boiling vinyl ether and the mixture heated with removal of acetic acid. Then the amine to be reacted is added and the desired cycle formation carried out.

Another method of forming the catalyst is to mix a common mercury salt of a strong acid, such as mercury sulfate and an alkali metal salt of a desired carboxylic acid. Thus, mercuric sulfate may be mixed with sodium oleate, or sodium benzoate, or sodium ethylbutyrate. Such mixtures simulate the mercury salts of the weak acids, but may not be as effective as a mercuric carboxylate as such.

The following examples are presented by way of illustration and not as limitations. Parts therein are by weight unless otherwise designated.

*Example 1*

One part of mercuric benzoate was added to a mixture of 60.9 parts (1.0 mole) ethanolamine and 152.9 parts (1.06 moles) 2-butoxylethyl vinyl ether and dissolved therein by vigorous shaking. A two-phase liquid mixture resulted with no exothermic reaction. This reaction mixture was placed in a reaction vessel connected to a distilling column and distillation started at 60 mm. pressure. Careful fractionation resulted in the following cuts:

| Cut | Pot Temp. | Vapor Temp. | Weight, parts |
|---|---|---|---|
| I | 88.5–86.5°C./60 mm | 49–53°C./60 mm | 0.9 |
| II | 87–90.5/60 | 52.5–56/60 | 21.1 |
| III | 92.5–99/60 | 50–55/60 | 19.6 |
| IV | 101–105/60 | 52–56/60 | 7.2 |
| V | | 44–62/20 | 3.2 |
| VI | | 64–71/20 | 5.2 |
| VII | | 71–75/20 | 101.3 |
| Residue | | | 56.4 |

After cut II was complete, 1 part of mercuric benzoate was added to the reaction mixture; after cut III was complete, another part of mercuric benzoate was added to the reaction mixture. From the manner in which the vapor temperature rose sharply at the end of cuts II, III, and IV, it appeared that catalyst had been completely deactivated at the ends of these fractions. Cuts II, III, and IV were crude 2-methyloxazolidine, $n_d^{25}$ 1.4340, representing a crude yield of 55% based on the amino-alcohol. Cut VII was 2-butoxyethanol, the other product of the reaction, and was obtained in 81% yield, based on the aminoalcohol. This indicates that the aminoalcohol had been converted to the oxazolidine in good yield, but had been lost after formation by subsequent irreversible decomposition or condensation.

*Example 2*

1-aminopropanol-2 (77.1 parts, 1.03 moles) was mixed with 171.9 parts (1.19 moles) of 2-butoxyethyl vinyl ether, forming a cloudy, two-phase mixture. One part of mercuric benzoate was added and dissolved by vigorous shaking; a homogeneous solution then resulted accompanied by evolution of heat which brought the temperature of the solution rapidly to 51° C. with some precipitation of metallic mercury. The solution was therefore cooled and stored overnight in the refrigerator at 1° C. On the following day, the reaction mixture was distilled starting at 100 mm. pressure.

| Cu | Pot Temp. | Vapor Temp. | Weight, parts |
|---|---|---|---|
| I | 88.5–97° C./100 mm | 55–56.5° C./100 mm | 0.1 |
| IIa | 98.5–107/100 | 56.5–68.5/100 | |
| IIb | 107.5–112.5/100 | 65.5–70/100 | 51.3 |
| III | 112–113.5/100 | 66–67/100 | 3.7 |
| IV | | 52–60/20 | 6.7 |
| V | | 60–72/20 | 6.2 |
| VI | | 72–75/20, 61–61.5/10 | 117.6 |
| Residue | | | 47.3 |

One part of mercuric benzoate was added to the reaction mixture at the end of cut IIa, and another part again at the end of cut IIb. Cuts IIa, IIb, and III were combined and redistilled:

| Cut | Boiling Range | Weight, parts |
|---|---|---|
| IR | 53.5–62.5° C./100 mm | 4.6 |
| IIR | 62.5–64.5° C./100 | 34.0 |
| Res | | 9.4 |

Cut IIR was pure 2,5-dimethyloxazolidine, $n_d^{25}$ 1.4366, $d_4^{25}$ 0.9371, and was thus obtained in 33% yield.

*Analysis.*—Calcd. for $C_5H_{11}ON$: C=59.37; H=10.96; N=13.85. Found: C=59.84, 60.05; H=11.38, 11.35; N=13.56, 13.94, 13.76.

Cut VI was 2-butoxyethanol, obtained in 97% yield, based on the aminoalcohol.

*Example 3*

One part of mercuric benzoate was dissolved in 135.8 parts (0.94 mole) 2-butoxyethyl vinyl ether and 75.3 parts (0.85 mole) 2-aminobutanol-1 was then dissolved in this solution. There was no exothermic reaction, but the solution turned yellow on addition of the aminoalcohol. This solution was heated under a distilling column at 40 mm. pressure.

| Cut | Pot Temp. | Vapor Temp. | Weight, parts |
|---|---|---|---|
| I | 78–84° C./40 mm | 34–60.5° C./40 mm | 0.7 |
| II | 84–87/40 | 63–65/40 | 14.2 |
| III | 84.5–94/40 | 63–68/40 | 40.1 |
| IV | 93.5–96/40 | 62.5–69/40 | 8.9 |
| V | | 57–67/20 | 5.0 |
| VI | | 67–72/20 | 4.5 |
| VII | | 72–77/20 | 77.9 |
| VIII | | 77–86/20 | 10.5 |
| Residue | | | 44.5 |

Additional increments of mercuric benzoate were added during reaction as follows: 1 part at the end of cut II and 1 part at the end of cut III. Cuts II, III, and IV were combined and redistilled through a Vigreux column:

| Cut | Boiling Range | Weight, parts |
|---|---|---|
| Ir | 59–63° C./40 mm | 1.5 |
| IIr | 63–66° C./40 | 53.5 |
| Res | | 6.9 |

Cut IIr was 2-methyl-4-ethyloxazolidine, $n_d^{25}$ 1.4407, $d_4^{25}$ 0.9219, thus obtained in 55% yield based on the aminoalcohol.

Calc. for $C_6H_{13}ON$: C=62.57; H=11.37; N=12.16. Found: C=62.83, 62.57; H=11.23, 11.32; N=11.80, 11.90.

Cut V was 2-butoxyethanol, recovered in 77% yield.

*Example 4*

To a solution of 140.8 parts (0.98 mole) 2-butoxyethyl vinyl ether in 79 parts (0.89 mole) 2-amino-2-methylpropanol-1, there was added 1.5 parts mercuric benzoate. There was no immediate exothermic reaction; the mercuric salt dissolved only partially, but went completely into solution with some precipitation of mercury during the subsequent distillation period. This mixture was then heated under a distilling column at an initial pressure of 109 mm. The following cuts were obtained:

| Cut | Pot Temp. | Vapor Temp. | Weight, parts |
|---|---|---|---|
| I | 97–103.5° C./109 mm | 51.5–69° C./109 mm | 1.8 |
| II | 103.5–104° C./109 mm | 70–70.5° C./109 mm | 15.3 |
| III | 100.5–103.5° C./105 mm | 66.5–69° C./105 mm | 0.2 |
| IV | 105–112° C./94 mm | 70/107–70.5/94 mm | 69.8 |
| V | | 69/91–52/16 | 8.8 |
| VI | | 65–70° C./16 mm | 4.9 |
| VII | | 70/16–75.5/20 | 91.9 |
| Residue | | | 28.2 |

An additional one part of mercuric benzoate was added at the end of cut II. Cuts II and IV were combined as crude product, representing an 83% crude yield, and were redistilled:

| Cut | Boiling Range | Weight, parts |
|---|---|---|
| Ir | 63.5–70.5° C./120 mm | 4.3 |
| IIr | 70.5–71.0° C./120 mm | 74.2 |
| Res | | 5.8 |

The yield of pure 2,4,4-trimethyloxazolidine (cut IIr) $n_d^{25}$ 1.4240, $d_4^{25}$ 0.8904 was therefore 72% based on the aminoalcohol.

*Analysis.*—Calcd. for $C_6H_{13}ON$: C=62.57; H=11.37; N=12.16. Found: C=62.82; H=11.49; N=12.08, 12.00.

The yield of 2-butoxyethanol, based on the aminoalcohol, was similarly 72%. Thus, in the case of this relatively stable oxazolidine, there appeared to have been no loss of product by further side reactions.

The infra-red spectrum of this product was determined and showed unequivocally that this material was identical with 2,4,4-trimethyloxazolidine, prepared by the reaction of acetaldehyde and 2-amino-2-methyl-1-propanol, and had no absorption bands characteristic of 2-amino-2-methylpropyl vinyl ether. It was concluded that any vinyl ether, if present at all, would have to be at less than 0.5% concentration.

*Example 5*

One part of mercuric acetate was added to a solution of 86.5 parts (1.20 mole) ethyl vinyl ether in 89.3 parts (1.0 mole) 2-amino-2-methylpropanol-1, and by vigorous shaking brought almost entirely into solution. There was no discernible exothermic reaction. The resulting water-white, slightly cloudy solution was heated under reflux for 5.5 hours, during which period the pot temperature rose from an initial 38° C. to a final 44° C. This reaction mixture was then cooled and flash-distilled at 0.5 mm. pressure with a final pot temperature of 90° C. into a receiver chilled with Dry Ice-acetone, resulting in a 164.9 part distillate and 4.8 part residue. This distillate was then fractionated into the following cuts:

| Cut | Boiling Range | Weight, parts |
|---|---|---|
| I | 36.5–37° C./atm | 59.3 |
| II | 39.5–52° C./120 mm | 6.3 |
| III | 52–68° C./120 mm | 1.8 |
| IV | 68–71.5° C./120 mm | 15.9 |
| V | 71.5–111/120 mm | 2.0 |
| VI | 111–113° C./120 mm | 59.7 |
| Res | 64–65° C./10 mm | 5.3 |

These cuts were identified as follows: cut I was recovered ethyl vinyl ether; cut IV had $n_d^{25}$ 1.4236 and was the product, 2,4,4-trimethyloxazolidine; cut VI was recovered 2-amino-2-methylpropanol-1. The conversion of 2-amino-2-methylpropanol-1 to 2,4,4-trimethyloxazolidine was therefore 14%, and the yield based on unrecovered aminoalcohol was 42.5%.

*Example 6*

To a solution of 45 parts (0.60 mole) N-methyl ethanolamine in 85.4 parts (0.75 mole) 1,2-divinoxyethane there was added 1 part of mercuric acetate. On addition of the mercuric salt, the solution darkened slightly and warmed spontaneously; the salt was only partially soluble when first added, but went completely into solution during the subsequent heating period. The mixture was placed under a distilling column and distillation started at 120 mm. pressure. The following cuts were taken:

| Cut | Pot Temp. | Vapor Temp. | Weight, parts |
|---|---|---|---|
| I | 73–78° C./120 mm | 46.5–53.5° C./120 mm | 6.0 |
| II | 78–80/120 | 54–57/120 | 18.8 |
| III | 80.5–88.5/125 | 62.5–73.5/125 | 49.6 |
| IV | 93–110.5/120 | 74–73.5/120–56/40 | 20.3 |
| Res | | | 32.7 |

Cuts I, II, and III were combined and refractionated:

| Cut | Boiling Range | Weight, parts | $n_d^{25}$ |
|---|---|---|---|
| Ir | 46–54° C./120 mm | 3.5 | |
| IIar | 54–55/120 | 27.5 | 1.4199 |
| IIbr | 54–55/120 | 13.2 | 1.4200 |
| IIIr | 55–71/120 | 4.1 | 1.4239 |
| IVr | 71–74.5/120 | 14.5 | |
| Res | | 6.7 | |

Cuts IIar and IIbr were the product, 2,3-dimethyloxazolidine, $n_d^{25}$ 1.4200, $d_4^{25}$ 0.9001, therefore obtained in 68% yield, based on the aminoalcohol.

*Analysis.*—Calcd. for $C_5H_{11}ON$: C=59.37; H=10.96; N=13.85. Found: C=59.38; H=10.74; N=13.77.

Cuts IV and IVr were recovered 1,2-divinoxyethane; thus the yield of oxazolidine based on unrecovered vinyl ether was 64%.

*Example 7*

One part of silver acetate was added to a solution of 43.5 parts (0.58 mole) N-methyl ethanolamine in 53.2 parts (0.47 mole) 1,2-divinoxyethane. The silver salt dissolved only slowly in this solution, but was brought almost entirely into solution by vigorous shaking. There was no discernible exothermic reaction. On standing for a few minutes at room temperature, the reaction mixture began to deposit a black solid, which may have been metallic silver. Distillation of this mixture was carried out at 120 mm. pressure. The reflux ratio was so adjusted as to keep the vapor temperature below 55° C.; over a period of approximately three hours 18.3 grams distillate, boiling point 50.5–55° C./120 mm. $n_d^{25}$ 1.4206, was collected. Although at the end of this period distillate was still coming over in this temperature range, the distillation was discontinued since heavy decomposition of the catalyst had coated the distillation flask with a silver mirror and it became impossible to determine the state of the reaction mixture. The yield of 2,3-dimethyloxazolidine, consequently only a minimum yield, was 32%.

*Example 8*

N-phenyl ethanolamine (141.5 parts, 1.03 mole) was dissolved in 86.3 parts (1.20 mole) ethyl vinyl ether and 1 part of mercuric acetate added to this solution. The solution warmed spontaneously and began to boil before all the mercuric salt had gone into solution. It was immediately placed on a reflux condenser and heated under reflux for two hours. During this period, the pot temperature rose from 45 to 78° C. The reaction mixture was then poured into a beaker and chilled in ice, whereupon it set to a crystalline mass. This solid was filtered out and recrystallized out of 2B ethanol, giving 143.8 parts of 2-methyl-3-phenyloxazolidine, melting point 58–59° C., a yield of 85.5%. This product was further purified by recrystallization from 30–60° petroleum ether, resulting in 107.5 parts of recrystallized product, melting point 58.5–59° C. (literature value, 60.5–61° C.). The yield of this purified product was 64%. A final recrystallization from naphtha gave an analytical sample, melting point 59–59.5° C.

*Analysis.*—Calcd. for $C_{10}H_{13}ON$: C=73.59; H=8.03; N=8.58. Found: C=73.62; H=7.89; N=8.54.

Example 9

One part of mercuric benzoate was added to a solution of 75.7 parts (1.01 mole) 3-aminopropanol-1 in 153.4 parts (1.07 mole) 2-butoxyethyl vinyl ether and dissolved therein by vigorous shaking. This reaction mixture was a two-phase liquid mixture, which upon addition of the mercuric salt, warmed spontaneously. It was placed under a distilling column and distillation carried out under 100 mm. pressure. Within a few minutes, a homogeneous single-phase solution resulted. Distillation gave the following cuts:

| Cut | Pot Temp. | Vapor Temp. | Weight, parts |
|---|---|---|---|
| I | 93–102.5° C./100 mm | 56.5–68.0° C./100 mm | 4.5 |
| II | 103–115/100 | 69–82/100 | 74.4 |
| III | | 82/100–66/20 | 4.0 |
| IV | | 66/20–70.5/20 | 9.5 |
| V | | 70.5–77/20 | 94.4 |
| Residue. | | | 39.1 |

Cuts I, II, and III were combined and refractionated:

| Cut | Boiling Range | Weight, parts |
|---|---|---|
| Ir | 54–68.5° C./100 mm | 5.3 |
| IIr | 68.5–69.0/100 | 66.1 |
| Res | | 5.8 |

Cut IIr was the product, 2-methyltetrahydro-1,3-oxazine, $n_d^{25}$ 1.4407, $d_4^{25}$ 0.9459.

*Analysis.*—Calcd. for $C_5H_{11}ON$: C=59.37; H=10.96; N=13.85. Found: C=59.57; H=11.00; N=13.59.

The yield of the product, based on the aminoalcohol, was 65%. Cut V was 2-butoxyethanol, obtained in 79% yield, based on the aminoalcohol.

Example 10

One part of mercuric acetate was dissolved, by vigorous shaking, in a solution of 76.7 parts (1.02 mole) 3-aminopropanol-1 in 86.9 parts (1.21 mole) ethyl vinyl ether. There was a mild exothermic reaction upon addition of the mercuric salt. The solution was then heated under reflux; orginally a two-phase liquid mixture, the solution became homogeneous shortly after reflux started. Reflux was continued for about 4 hours, during which period the pot temperature rose from 41.5 to 70° C. The reaction mixture was then cooled and vacuum flash-distilled at less than 1 mm. with a maximum pot temperature of 100° C. into a receiver chilled with Dry Ice-acetone, resulting 151.6 parts of distillate, containing a cloudy suspension of mercury metal, and a residue of 11.6 parts. The distillate was filtered in an attempt to remove the mercury, and a loss of 12.8 parts was sustained in this attempt. The filtrate was then fractionated:

| Cut | Boiling Range | Weight, parts | $n_d^{25}$ |
|---|---|---|---|
| I | 36–36.5° C./atm | 16.3 | |
| II | 42–52/214 mm | 29.4 | |
| III | 35–36/100 | 3.6 | |
| IV | 45–68.5/100 | 2.2 | |
| V | 68.5–70.5/100 | 52.6 | 1.4405 |
| VI | 35–36/20 | 6.0 | 1.4406 |
| VII | 42–89/20 | 0.9 | |
| VIII | 89–92.5/20 | 3.5 | |
| Res | | 9.0 | |

The cuts were identified as follows: cut I was recovered ethyl vinyl ether, cuts II and III were ethanol, cuts V and VI were 2-methyltetrahydro-1,3-oxazine, and cut VIII was recovered 3-aminopropanol-1. The conversion of 3-aminopropanol-1 to 2-methyltetrahydro-1,3-oxazine was therefore 57% and the yield based on unrecovered amino alcohol 60%. The yield of ethanol, based on the 3-aminopropanol-1 charged, was 74%.

Example 11

Ethylenediamine (65.5 parts, 1.09 mole) was dissolved in 133.5 parts (1.85 mole) ethyl vinyl ether and 1 part of mercuric benzoate added to this solution. The mercuric salt dissolved only partially, even with vigorous shaking; there was no immediate exothermic reaction. The mixture was then heated under reflux for 8 hours. During this period, the pot temperature rose from 42 to 51° C., and almost all of the mercuric salt went into solution, accompanied by the formation of some globules of mercury. The solution, which was still water-white, was then cooled and left overnight at room temperature. On the following day, another 1 part of mercuric benzoate was added; this time the mercuric salt went rapidly and completely into solution. Reflux was resumed; over a 1-hour period, the pot temperature rose from 51.5 to 60° C. The solution was then cooled and vacuum flash-distilled into a receiver chilled with Dry Ice-acetone at less than 1 mm. pressure. The first cut of this flash-distillation, 66.9 parts, was obtained without heating the distilling pot; this cut was terminated when a solid material started to plug the outlet of the take-off tube. A wide-bore outlet was then utilized and the second cut made by heating the pot on a steam bath to a pot temperature of 73° C. This second cut, 107.7 parts, was partly solid at room temperature, but the solid soon dissolved in the liquid portion. The residue weighed 18.1 parts.

The above second cut was overlaid with about twice its volume of naphtha, well shaken, and chilled in Dry Ice-acetone to induce crystallization. The crystals were filtered from the resultant two-phase liquid mixture under nitrogen. The filtrate was again well-shaken and chilled to induce further crystallization. The solid was again filtered off under nitrogen. This operation was repeated about six times, until no further crystallization occurred. The combined solid product was dried under vacuum at room temperature. The yield of this once-crystallized product, melting point 46–49° C., was 38.4 parts, 41% based on the diamine. This material was recrystallized out of low-boiling petroleum ether to obtain an analytical sample, which was a white, very hygroscopic solid, melting point 47.5–48.5° C. This material was titrated potentiometrically with standard 0.1 HCl to obtain a neutralization equivalent: replicate samples gave values of 43.39 and 42.91 (theo. for 2-methylimidazolidine, 43.07).

Example 12

N,N'-diphenylethylenediamine (100.9 parts, 0.48 mole) was shaken vigorously with 72.0 parts (1.0 mole) ethyl vinyl ether, but only a small part of the solid diamine dissolved. One part of mercuric benzoate was dissolved in this mixture, and a strong exothermic reaction then resulted. The mixture was immediately placed on reflux and heating applied when the initial exothermic reaction subsided. After 21 minutes of reflux almost all of the solid had gone into solution and the pot temperature had risen from 35.5 to 49° C. Almost immediately thereafter, crystallization suddenly occurred, filling the flask with solid and lowering the pot temperature to 42° C. After a further 40 minutes of reflux, the mixture was cooled and the solid product stripped dry under vacuum. Part of this solid was recrystallized from methanol, melting point 90–91.5° C., and the remainder from naphtha, melting point 91.5–95° C. The total yield of recrystallized product was 93.4 parts, 82% based on diamine. This product was further recrystallized out of methanol, giving 75 parts of material, melting point 92–93.5° C., ebulliometric molecular weight, 226 (theo. for 2-methyl-1,2-diphenylimidazolidine, 238).

*Analysis.*—Calcd. for $C_{16}H_{18}N_2$: C=80.63; H=7.61;

N=11.76. Found: C=80.38, 80.43; H=7.55, 7.43; N=11.76.

*Example 13*

One part of mercuric benzoate was dissolved in a solution of 89.5 parts (0.32 mole) of N,N'-di-2-ethylhexyl-ethylenediamine in 73.6 parts (1.0 mole) of ethyl vinyl ether. There was immediate appearance of metallic mercury. A slow exothermic reaction carried the temperature of the solution to 35° C. as the deposit of mercury increased in extent. The solution was heated under reflux for 5.5 hours and then left overnight at room temperature. On the following morning, an additional 1 part of mercuric benzoate was dissolved in the solution and this reaction mixture refluxed for another 2 hours. The reaction mixture was then stripped of low-boiling material by heating the mixture to 30° C. at about 1.0 mm. pressure. The residue, which weighed 92.8 parts, was fractionated into the following cuts:

| Cut | Pot Temp. | Vapor Temp. | Weight, parts | $n_d^{25}$ |
|---|---|---|---|---|
| I | 159–164° C./0.7 mm | 135–138.5/0.7 | 1.7 | 1.4617 |
| II | 164–162/0.7 | 137–138.5/0.7 | 7.9 | 1.4608 |
| III | 162–164/0.7 | 138.5–139/0.7 | 18.6 | 1.4572 |
| IV | 159–166/0.6 | 136–138/0.6 | 10.9 | 1.4563 |
| V | 164–164/0.7 | 138–139/0.7 | 18.2 | 1.4558 |
| VI | 164–165/0.6 | 139/0.6 | 8.1 | 1.4563 |
| VII | 165–166.5/0.6 | 139/0.6 | 9.8 | 1.4571 |
| N,N'-di-2-ethylhexylethylenediamine | | | | 1,4395 |
| Residue | | | 15.9 | |

Cuts III, IV, V, VI, and VII were N,N'-di(2-ethylhexyl)-2-methylimidazolidine.

The compounds of this invention are useful as corrosion inhibitors. For instance, any one or several of the compounds may be added to an aqueous acid to decrease the rate of attack of the acid on a metal, such as iron. Where the compound is not fully soluble in such acid, it may be mixed with a non-ionic wetting agent. For example, there were mixed one part of 2-methyl-1,3-diphenylimidazolidine and three parts of a water-soluble octylphenoxypolyethoxyethanol. The mixture was added to aqueous 10% hydrochloric acid solution in an amount of about 1.5% and tested on steel sheets. The uninhibited acid gave an attack of 3.1 lbs. per sq. ft. per day. With the above compound present the rate was 0.0689 lb. per sq. ft. per day. Acid with only the octylphenoxypolyethoxyethanol was not inhibited. Other compounds of this invention act similarly.

The compounds are also useful for treating cellulose acetate to improve gas fading of dyed fibers and fabrics. This is particularly true of the compounds where A is =NH or NR. These compounds can be added to the spinning dope or fibers or filaments may be treated therewith.

These compounds exhibit fungistatic and fungicidal action. Thus, in standard fungitoxicity tests 2-methyl-3-phenyloxazolidine inhibited the germination of spores of *Stemphylium sarcinaeforme* and of *Monilinia fructicola* completely at 1%. The compound 2-methyl-1,3-diphenylimidazolidine inhibited the germination of spores of these fungi completely at 1% and 50% to 70% at 0.1%. Other compounds made above have similar activities.

I claim:

1. A process for preparing cyclic compounds of the structure

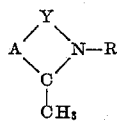

which comprises mixing a compound of the formula

HA-Y-NHR a vinyl ether, R⁰OCH=CH₂, and catalyst from the class consisting of silver salts soluble in water and mercury salts of carboxylic acids having a pKa value in water of 3.5 to 7, heating the mixture between 50° and 150° C., and separating a said cylic compound, in the above formulas R⁰ being a member of the class consisting of alkyl, alkenyl, cycloalkyl, aralkyl, alkoxyalkyl, phenoxyalkyl, and hydroxyalkyl, R being a member of the class consisting of hydrogen and hydrocarbon groups of not over 12 carbon atoms free of olefinic and acetylenic unsaturation, A being a member of the class consisting of —O—, =NH, and =NR, and Y being an alkylene group having two to three carbon atoms between A and N and containing a total of not over 12 carbon atoms.

2. A process for preparing cyclic compounds of the structure

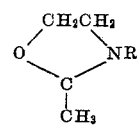

which comprises mixing an amino alcohol,

HOCH₂CH₂NHR a vinyl ether, R⁰OCH=CH₂, and a catalyst from the class consisting of silver salts soluble in water and mercury salts of carboxylic acids having a pKa value in water of 3.5 to 7, heating the mixture between 50° and 150° C., and separating a said cyclic compound, in the formulas R⁰ being a member of the class consisting of alkyl, alkenyl, cycloalkyl, aralkyl, alkoxyalkyl, phenoxyalkyl, and hydroxyalkyl groups, and R being a hydrocarbon group of not over 12 carbon atoms and free of olefinic and acetylenic unsaturation.

3. A process for preparing cyclic compounds of the structure

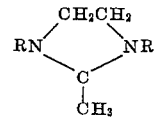

which comprises mixing a diamine, RHNCH₂CH₂NHR, a vinyl ether, R⁰OCH=CH₂, and a catalyst from the class consisting of silver salts soluble in water and mercury salts of carboxylic acids having a pKa value in water of 3.5 to 7, heating the mixture between 50° and 150° C., and resolving the reaction mixture, R being a hydrocarbon group of not over 12 carbon atoms and free of olefinic and acetylenic unsaturation.

4. A process for preparing cyclic compounds of the structure

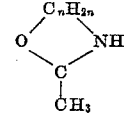

which comprises mixing a compound of the formula

HOC$_n$H$_{2n}$NH₂ n being an integer from two to four with two to three carbon atoms of the C$_n$H$_{2n}$ group occurring between O and N, a vinyl ether, R⁰OCH=CH₂, and as catalyst a mercury salt of a carboxylic acid having a pKa value in water of 3.5 to 7, heating the resulting mixture between 50° and 150° C., and separating a said cyclic compound, R⁰ being a member of the class consisting of alkyl, alkenyl, cycloalkyl, aralkyl, alkoxyalkyl, phenoxyalkyl, and hydroxyalkyl groups.

5. A process for preparing cyclic compounds of the structure

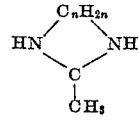

which comprises mixing a diamine, $H_2NC_nH_{2n}NH_2$, $n$ being an integer from two to four with two to three carbon atoms of the $C_nH_{2n}$ group occurring between O and N, a vinyl ether $R^0OCH=CH_2$, and as catalyst a mercury salt of a carboxylic acid having a pKa value in water of 3.5 to 7, heating the resulting mixture between 50° and 150° C., and separating a said cyclic compound, $R^0$ being a member of the class consisting of alkyl, alkenyl, cycloalkyl, aralkyl, alkoxyalkyl, phenoxyalkyl, and hydroxyalkyl groups.

No references cited.